(12) United States Patent
Wang et al.

(10) Patent No.: US 11,074,225 B2
(45) Date of Patent: *Jul. 27, 2021

(54) SYNCHRONIZATION OF INDEX COPIES IN AN LSM TREE FILE SYSTEM

(71) Applicant: VMware, Inc., Palo Alto, CA (US)

(72) Inventors: Wenguang Wang, Santa Clara, CA (US); Richard P. Spillane, Palo Alto, CA (US); Junlong Gao, Mountain View, CA (US); Robert T. Johnson, Palo Alto, CA (US); Christos Karamanolis, Los Gatos, CA (US); Maxime Austruy, Lausanne (CH)

(73) Assignee: VMware, Inc., Palo Alto, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 16/231,246

(22) Filed: Dec. 21, 2018

(65) Prior Publication Data

US 2020/0201821 A1 Jun. 25, 2020

(51) Int. Cl.
| | |
|---|---|
| *G06F 7/00* | (2006.01) |
| *G06F 16/178* | (2019.01) |
| *G06F 16/13* | (2019.01) |
| *G06F 16/172* | (2019.01) |
| *G06F 16/185* | (2019.01) |

(52) U.S. Cl.
CPC ............ *G06F 16/178* (2019.01); *G06F 16/13* (2019.01); *G06F 16/172* (2019.01); *G06F 16/185* (2019.01)

(58) Field of Classification Search
CPC ...... G06F 16/178; G06F 16/13; G06F 16/172; G06F 16/185; G06F 16/2246; G06F 16/27; G06F 16/31; G06F 16/316; G06F 16/275; G06F 16/1787
See application file for complete search history.

(56) References Cited

U.S. PATENT DOCUMENTS 8,589,403 B2 * 11/2013 Marquardt .......... G06F 16/1734
707/741
8,935,487 B2 * 1/2015 Sengupta .............. G06F 16/137
711/154

(Continued)

OTHER PUBLICATIONS

Kai Ren, Fast Storage for File System metadata, School of Computer Science Carnegie Mellon University Pittsburgh, PA 15213, Sep. 26, 2017 (Year: 2017).*

(Continued)

*Primary Examiner* — Mohammed R Uddin

(57) ABSTRACT

The disclosure herein describes synchronizing cached index copies at a first site with indexes of a log-structured merge (LSM) tree file system on an object storage platform at a second site. An indication that the LSM tree file system has been compacted based on a compaction process is received. A cached metadata catalog of the included parent catalog version at the first site is accessed. A set of cached index copies is identified at the first site based on the metadata of the cached metadata catalog. The compaction process is applied to the identified set of cached index copies and a compacted set of cached index copies is generated at the first site, whereby the compacted set of cached index copies is synchronized with a respective set of indexes of the plurality of sorted data tables of the LSM tree file system at the second site.

20 Claims, 9 Drawing Sheets

(56) References Cited

U.S. PATENT DOCUMENTS

| | | | |
|---|---|---|---|
| 2014/0279855 A1* | 9/2014 | Tan | G06F 16/273 |
| | | | 707/609 |
| 2017/0060898 A1* | 3/2017 | Lu | G06F 16/2246 |
| 2017/0212680 A1* | 7/2017 | Waghulde | G06F 16/185 |
| 2017/0249257 A1* | 8/2017 | Bonnet | G06F 12/0804 |
| 2017/0329705 A1* | 11/2017 | Gupta | G06F 12/0253 |
| 2018/0107402 A1* | 4/2018 | Pogosyan | G06F 3/0641 |
| 2018/0349095 A1* | 12/2018 | Wu | G06F 3/067 |
| 2019/0004768 A1* | 1/2019 | Li | G06F 7/36 |
| 2019/0007206 A1* | 1/2019 | Surla | H04L 63/0428 |
| 2019/0043540 A1* | 2/2019 | Chagam Reddy | G06F 3/0656 |

OTHER PUBLICATIONS

Unknown, "Amazon Elastic File System (EFS)," Amazon Web Services, Inc., Accessed Dec. 17, 2018, https://aws.amazon.com/efs/, 21 pages.

Unknown, "What Is Amazon S3?," Amazon Web Services, Inc., Accessed Dec. 17, 2018, https://docs.aws.amazon.com/AmazonS3/latest/dev/Welcome.html,1 page.

Unknown, "Request Rate and Performance Guidelines," Amazon Web Services, Inc., Accessed Dec. 17, 2018, https://docs.aws.amazon.com/AmazonS3/latest/dev/request-rate-perf-considerations.html, 1 page.

Unknown, "Amazon EC2," Amazon Web Services, Inc., Accessed Dec. 17, 2018, https://aws.amazon.com/ec2/?nc2=h_m1, 13 pages.

Unknown, "AWS Lambda," Amazon Web Services, Inc., Accessed Dec. 17, 2018, https://aws.amazon.com/lambda/?nc2=h_m1, 14 pages.

Unknown, "AWS Storage Gateway: File gateway for hybrid architectures overview and best practices," Amazon Web Services, Inc., Accessed Dec. 17, 2018, https://d1.awsstatic.com/whitepapers/aws-storage-gateway-file-gateway-for-hybrid-architectures.pdf, 18 pages.

Unknown, "AWS Storage Gateway Faqs," Amazon Web Services, Inc., Accessed Dec. 17, 2018, https://aws.amazon.com/storagegateway/faqs/, 27 pages.

Bender, et al., "Cache-Oblivious Streaming B-Trees," In Proceedings of the Nineteenth Annual ACM Symposium on Parallel Algorithms and Architectures, SPAA '07, Jun. 9-11, 2007, 12 pages.

Brodal, et al., "Lower Bounds for External Memory Dictionaries," Alcom-FT Technical Report Series, ALCOMFT-TR-03-75, Accessed Dec. 17, 2018, http://tildeweb.au.dk/au121/papers/alcomft-tr-03-75.pdf, 13 pages.

Chang, et al., "Bigtable: A Distributed Storage System for Structured Data," Google, Inc., Accessed Dec. 18, 2018, https://static.googleusercontent.com/media/research.google.com/en//archive/bigtable-osdi06.pdf, 14 pages.

Unknown, "Welcome to RocksDB," GitHub, Inc., Sep. 7, 2017, https://github.com/facebook/rocksdb/wiki/Open-Projects, 6 pages.

Unknown, "Storage Engine," DataStax, Inc., Oct. 17, 2018, http://docs.datastax.com/en/cassandra/2.1/cassandra/dml/dml_manage_ondisk_c_html, 1 page.

Unknown, "Google Cloud Storage Documentation," Google, Inc., Accessed Dec. 18, 2018, https://cloud.google.com/storage/docs/#, 2 pages.

Unknown, "How Do I Ensure Data Integrity of Objects Uploaded to or Downloaded from Amazon S3?," Amazon Web Services, Inc., Accessed Dec. 18, 2018, https://aws.amazon.com/premiumsupport/knowledge-center/data-integrity-s3/, 7 pages.

Unknown, "ObjectiveFS: A Shared Distributed Posix File System Backed by an Object Store," Amazon Web Services, Inc., Accessed Dec. 19, 2018, https://objectivefs.com, 7 pages.

O'Neil, et al., "The Log-Structured Merge-Tree (LSM-tree)," Accessed Dec. 19, 2018, https://www.cs.umb.edu/~poneil/lsmtree.pdf, 32 pages.

Palankar, et al., "Amazon s3 for Science Grids: A Viable Solution?," Accessed Dec. 21, 2018, http://citeseer.ist.psu.edu/viewdoc/download;jsessionid=20ECF0F566448EB9ACED424A739F8CF9?doi=10.1.1.112.9646&rep=rep1&type=pdf, 1 page.

Raju, et al., "PebblesDB: Building Key-Value Stores Using Fragmented Logstructured Merge Trees," Accessed, Dec. 21, 2018, www.cs.utexas.edu/~vijay/papers/sosp17-pebblesdb.pdf, 18 pages.

Unknown, "s3fs: Fuse-Based File System Backed by Amazon s3," GitHub, Accessed Dec. 19, 2018, https://github.com/s3fs-fuse/s3fs-fuse, 4 pages.

Unknown, "SQLite4 LSM Users Guide," SQLite, Accessed Dec. 19, 2018, https://sqlite.org/src4/doc/trunk/www/lsmusr.wiki, 18 pages.

Unknown, "YAS3FS: Yet Another s3-backed File System," GitHub, Accessed Dec. 21, 2018, https://github.com/danilop/yas3fs, 11 pages.

Kougkas, et al., "Enosis: Bridging the Semamtic Gap Betweem File-Based and Object-Based Data Models", The International Conference for High Performance Computing, Networking, Storage and Analysis, Workshop: The Eighth International Workshop on Data-Intensive Computing in the Clouds, published 2017, 8 pages.

* cited by examiner

SYNCHRONIZATION OF INDEX COPIES IN AN LSM TREE FILE SYSTEM

BACKGROUND

A log-structured merge (LSM) tree provides indexed access to files, including efficient reading of data and immutable writing that eliminates performance costs associated with overwriting specific data locations. However, for an LSM tree to perform well, upkeep processing known as compaction must be performed occasionally as more and more data is introduced. Compaction may require significant system resources when performed, which may negatively affect other operations, such as reading from and writing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for synchronizing cached index copies at a first site with indexes of a log-structured merge (LSM) tree file system on an object storage platform at a second site is described. An indication that the LSM tree file system has been compacted based on a compaction process is received, the indication including a parent catalog version associated with a compacted metadata catalog generated at the second site during the compaction process. A cached metadata catalog of the included parent catalog version at the first site is accessed. The cached metadata catalog includes metadata associated with a plurality of sorted data tables of the LSM tree file system. A set of cached index copies is identified at the first site associated with the plurality of sorted data table based on the metadata of the cached metadata catalog. The compaction process is applied to the identified set of cached index copies based on the metadata of the cached metadata catalog and, based on the application of the compaction process to the set of cached index copies, a compacted set of cached index copies is generated at the first site, whereby the compacted set of cached index copies is synchronized with a respective set of indexes of the plurality of sorted data tables of the LSM tree file system at the second site.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
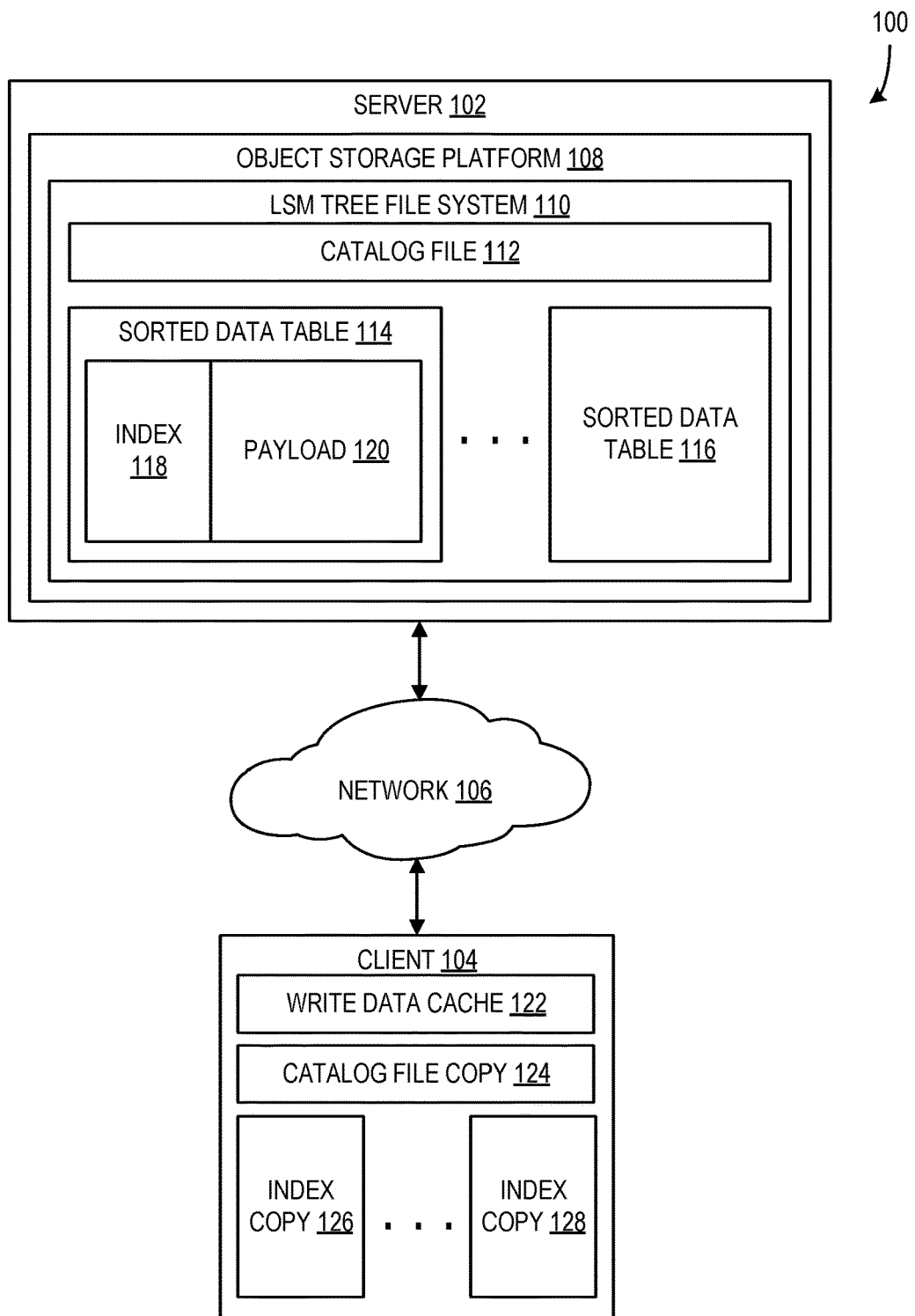
FIG. 1 is an exemplary block diagram illustrating a system configured for storing a providing access to data in on an object storage platform according to an embodiment.

An LSM tree may be used as a file system for an object storage platform. Some issues associated with such an LSM tree file system arrangement may be alleviated through the use of an asynchronous cache that stages data to be written to the LSM tree file system and de-stages the data to the file system in large batches. The cache side may perform I/O operations independently from the LSM tree file system, even when the LSM tree file system is in the midst of a compaction process. However, synchronization of the cache and the file system presents another set of challenges. If the cache is out of sync with the file system, accurate reading and writing of data may require additional processing on the LSM tree file system side, reducing the positive effects of implementing the cache. Alternatively, if said processing is performed on the cache side when the cache is out of sync, accurate reading and writing of data to the file system may be essentially impossible after a compaction is performed on the file system, as much of the data may be rearranged. In one example, the LSM tree file system and cache side may maintain parallel metadata indexes that are representative of the structure of the LSM tree file system. However, frequent transfers of large quantities of metadata indexes between the file system and cache after each compaction may require substantial bandwidth and result in increased costs for use of the object storage platform.

In contrast, aspects of the disclosure provide a computerized method and system for synchronizing cached data index copies at a first site with indexes of an LSM tree file system on an object storage platform at a second site. When an indication that the LSM tree file system has been compacted is received, a cached metadata catalog representative of the state of the LSM tree prior to compaction is accessed. The cached metadata catalog includes metadata associated with a plurality of sorted data tables of the LSM tree file system. A set of cached index copies is identified at the first site associated with the plurality of sorted data table. The compaction process is applied to the identified set of cached index copies based on the metadata of the cached metadata catalog. Based on the application of the deterministic compaction process to the set of cached index copies, a compacted set of cached index copies is generated at the first site, whereby the compacted set of cached index copies is synchronized with a respective set of indexes of the plurality of sorted data tables of the LSM tree file system at the second site.

The disclosure operates in an unconventional way by enabling the data cache at the first site to operate asynchronously from the LSM tree file system at a second site. As a result, the LSM tree file system may be configured as cloud storage for use by local applications, virtual machines, virtual computing instances, or the like on a client device or devices. The disclosure is further configured to localize many data processing operations on the client side that may otherwise occupy significant processing resources in the cloud and/or bandwidth resources associated with a network connection to the cloud. For example, write amplification is reduced. For instance, by using the described metadata catalogs and locally cached copies of sorted data table indexes, the determination of whether compaction is necessary may be performed locally and, further, compaction operations may be performed on the locally cached index copies, avoiding relatively large metadata uploads or downloads each time compaction is performed on the LSM tree file system.

Additionally, upon performing compaction of the cached index copies, any remaining, unused index copies may be flagged for garbage collection and later reclaimed. Further data reads and other interactions by the cache site with the LSM tree file system are enabled by the synchronized, locally cached index copies.

It should be understood that locally caching data includes storing the data or other components at the client 104 or, alternatively, storing the data or other components separately from the LSM tree file system and apart from or outside of the associated object storage platform. For instance, in some examples, locally cached data may be stored and maintained on multiple clients that are separate from the LSM tree file system.

FIG. 1 is an exemplary block diagram illustrating a system 100 configured for storing and providing access to data (e.g., payload 120 data) on an object storage platform 108 according to an embodiment. The system 100 includes a server 102 and a client 104 that are in communication via a network 106. The server includes an object storage platform 108 upon which an LSM tree file system 110 is implemented. In some examples, the server 102 and client 104 are computing devices that include hardware, firmware, and/or software configured to perform the operations described herein as well as other general computing operations. Alternatively, or additionally, the system 100 may include multiple server devices configured as the server 102 and including the object storage platform 108, such that the described data storage is distributed across the multiple server devices. Further, the system 100 may include multiple client devices configured to access the object storage platform 108 as described herein without departing from the description.

The network 106 includes one or more computer networks that are configured to enable network communications between the server 102 and the client 104. It should be understood that communications between components of the system 100 may be performed using network connections on the network 106 as would be understood by a person of ordinary skill in the art of computer networks and communications. The network 106 may include a plurality of networks (e.g., private intranets, public networks such as the Internet, etc.) and/or network types (e.g., wired networks, wireless networks such as Wi-Fi networks or cellular networks, etc.). The network 106 may include any hardware, firmware, and/or software arranged in hierarchies or structures that enable the components of the system 100 to communicate as described without departing from the description herein.

The object storage platform 108 is configured to operate according to object storage principles as would be understood by a person of ordinary skill in the art. The object storage platform 108 may be configured to abstract the storage of the associated data to be exposed and/or managed as objects, which may include the data itself, associated metadata, and/or a unique identifier of the particular object.

In some examples, the object storage platform 108 is configured such that overwriting existing data and/or performing many small data writes is relatively expensive (e.g., the platform 108 may not support overwriting, such that changes to one byte of a file may result in the rewriting of the entire file, many small files may be stored as individual objects, resulting in many separate requests for object transfers and other operations, etc.).

The LSM tree file system 110 is implemented on the object storage platform 108, effectively transforming the object storage interface of the platform 108 into a block device interface where block offset values are used as keys of key-value tuples and block content is used as the values of the tuples. The LSM tree file system 110 includes a catalog file 112 and a plurality of sorted data tables 114-116. It should be understood that, while only two sorted data tables are illustrated, the file system 110 may include more, fewer, or different sorted data tables without departing from the description herein. Each sorted data table 114-116 includes an index 118 and a payload 120. It should be understood that the LSM tree file system 110 is configured to adhere to known LSM tree principles unless otherwise specified herein (e.g., the LSM tree file system 110 is optimized for "immutable write", such that edited data is not overwritten, but rather, replacement data is appended to unused space in the file system, etc.), and operates as described herein. In some examples, the catalog file 112 includes up-to-date metadata associated with all sorted data tables 114-116 of the file system 110, such that the catalog file 112 serves as a superblock for the entire file system 110. Such metadata may include unique identifiers of the tables 114-116 and other metadata used to identify locations of data (e.g., identify the sorted data table within which a particular set of data is stored, etc.) within the file system 110 as described herein. The configuration of the catalog file 112 is described in greater detail below with respect to FIG. 2.

In some examples, the LSM tree file system 110 exposes application program interfaces (APIs) for use by other entities, such as the client 104. For instance, the file system 110 may expose a "lookup" API that enables the client 104 to request data based on a provided key value or other location data (e.g., table identifier, offset values, address values, etc.) and an "update" API that enables the client 104 to write or otherwise record data to the file system 110. Such APIs may be configured to perform a portion of or all of the operations as described herein with respect to interacting with the data stored in the file system 110.

It should be understood that, while use of an LSM tree file system is primarily described, in other examples, other types of write optimized tree structures and/or techniques may be used (e.g., cache oblivious look-ahead arrays (COLA), $B^\varepsilon$-trees, fractal cascade trees, copy on write, etc.).

Further, in some examples, the object storage platform 108 and associated LSM tree file system 110 are configured to be used as a virtual disk by virtual machines or other software entities on the client 104 or other software entities associated with other devices.

Each of the sorted data tables 114-116 (e.g., Sorted String Tables, etc.) store data in the payload 120 and index 118 is configured to provide information about the specific locations of data in the payload 120. In some examples, the LSM tree file system 110 provides access to data in the form of data blocks of uniform size that are indexed by an offset location or address of each data block in the file system (e.g., each data block may be 4 KB in size and indexed by a numeric value that indicates a number of blocks that the data block is offset from the beginning of the file system, etc.). In such a configuration, the index 118 may contain keys that indicate an offset location of the associated data block within the file system and values mapped to the keys that indicate an offset location of the data block within the specific payload 120. Further, in some examples, catalog file 112 and the index 118 and payload 120 of each sorted data table 114-116 may be stored as separate objects with respect to the object storage platform 108. The structure of the sorted data tables 114-116 are described in greater detail below with respect to FIG. 2.

It should be understood that, in some examples, the file system 110 may be configured to include bloom filters that enable the efficient determination of whether a particular data tuple is present in a given sorted data table. However, because the file system 110 includes a catalog file 112 and an index 118 for each sorted data table 114-116, the metadata contained therein may be used to identify the location of a particular data tuple as described herein without using a bloom filter in other examples.

The example client 104 includes a write data cache 122, a catalog file copy 124, and a plurality of index copies 126-128. The write data cache 122 may be installed or otherwise stored on the client 104. The client 104 is configured to use the write data cache 122 when writing data to the file system 110 and the catalog file copy 124 and index copies 126-128 when reading data from the file system 110. In some examples, the client 104 is configured to write data to the write data cache 122 that is intended to be written to the LSM tree file system 110. The client 104 may be configured to only write data values that are new or are being changed to the write data cache 122 rather than, for instance, entire files that are largely the same but include some data values being changed. The write data cache 122 may have an associated capacity threshold and/or an expiration time interval. The client 104 may be configured to send the data in the write data cache 122 when the quantity of data in the cache 122 meets or exceeds the capacity threshold. Additionally, or alternatively, the client 104 may be configured to send the data in the write data cache 122 when the time passed since the last write to the server 102 meets or exceeds the expiration time interval of the cache 122. The capacity threshold and/or expiration time interval may be defined as default values or otherwise set by users of the system 100.

In some examples, the client 104 is configured to use the locally cached catalog file copy 124 and index copies 126-128 to identify locations of data to be read from the file system 110 prior to accessing the server 102. For instance, to read a set of data from a particular location address in the file system 110, the client 104 may search the catalog file copy 124 to identify the sorted data table or tables on which the desired set of data is stored and search the index copies 126-128 associated with the identified sorted data table or tables for offset locations of the set of data within the identified tables. The client 104 may use the identified tables and associated offset locations to request the desired set of data from the file system 110 on the server 102. Such use of the catalog file copy 124 and/or index copies 126-128 may reduce the relative resource costs associated with performing the search operations and read operations in the file system 110 on the server 102.

Further, the client 104 may be configured to maintain up-to-date versions of the catalog file copy 124 and index copies 126-128 by retrieving or otherwise receiving catalog file data and index data from the server 102 on a periodic basis and/or when triggered by occurrence of defined events. In some examples, the client 104 may retrieve or otherwise receive updated versions of the catalog file 112 from the server 102 and, based on the metadata structure defined by the most recently received catalog file version, generate up-to-date index copies 126-128. Alternatively, or additionally, the client 104 may be configured to generate updated versions of the catalog file copy 124 and/or index copies 126-128 based on the data stored in the write data cache 122 and/or otherwise stored on the client 104. This process is described in greater detail below. Further, other methods for maintaining up-to-date versions of the catalog file copy 124 and index copies 126-128 are operable with the present disclosure.

In some examples, the system may be configured to provide additional features, such as compression, checksum verification, encryption, or the like. For instance, the client 104 may be configured to compress data in a manner understood by a person of ordinary skill in the art prior to sending it to be written in the LSM tree file system 110. Such compression may require that the associated indexes (e.g., index 118) be configured to account for the compressed size.

Alternatively, or additionally, the LSM tree file system 110 may be configured to include checksums for the data being stored in the sorted data tables 114-116. Such checksums may be generated per block or based on another data unit size and the checksums may be stored in the index 118 of the associated sorted data table 114. Later, when data is ready by the client 104, the checksum in the index 118 may be verified according to methods understood by a person of ordinary skill in the art.

In further examples, the system 100 may be configured to provide encryption of data being stored on the LSM tree file system 110. For instance, the client 104 may be configured to encrypt data according to any known technique prior to writing the data to the LSM tree file system 110 and to decrypt the data according to the associated decryption technique after it is retrieved from the LSM tree file system 110. Because the file system 110 and object storage platform 108 are largely agnostic regarding the arrangement of the data therein, so long as the client 104 is configured to perform the encryption and decryption operations, other operations (e.g., the server-side operations) may be performed in the same manner as described herein.

Figure 2:
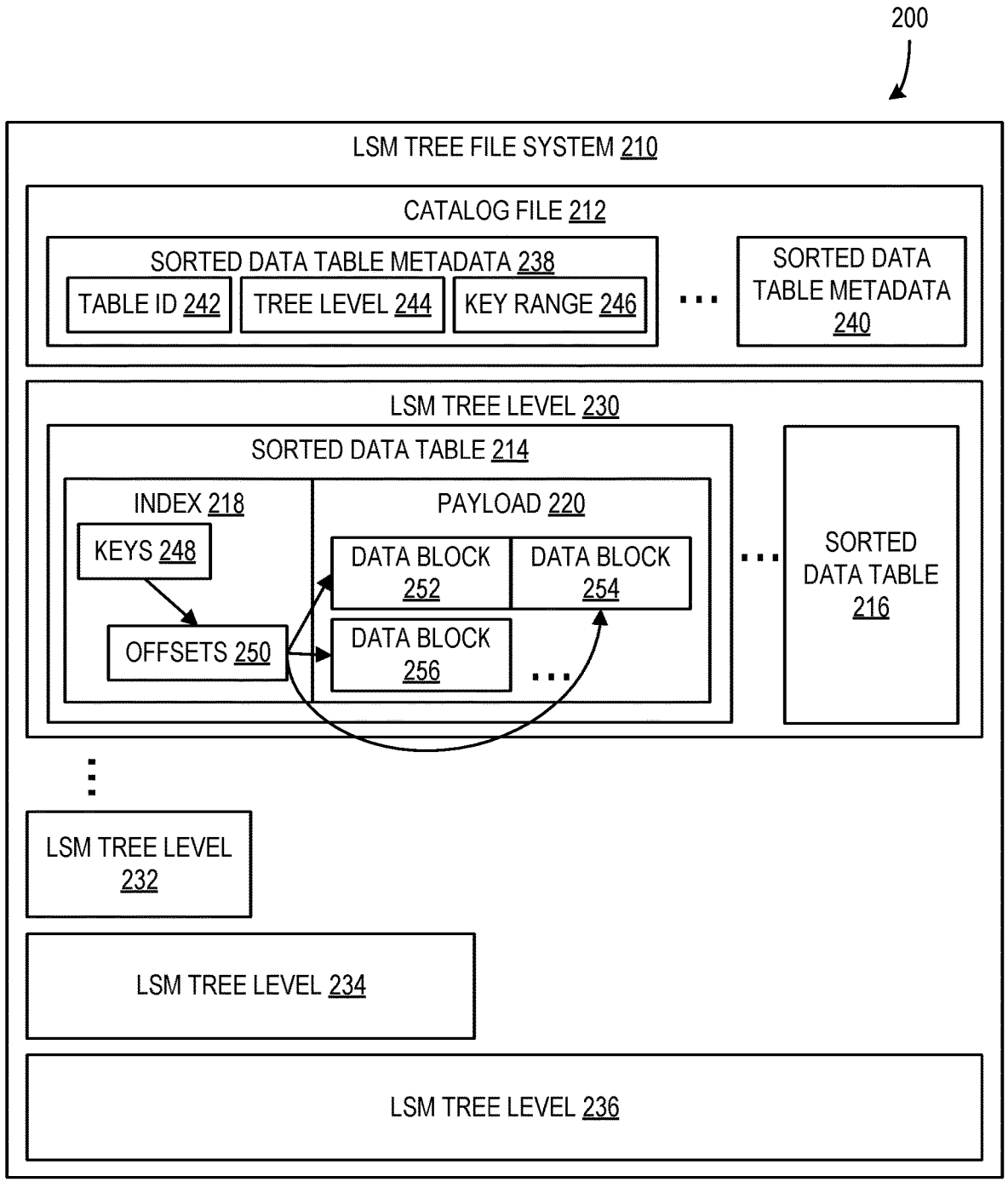
FIG. 2 is an exemplary block diagram illustrating a configuration of an LSM tree file system for use on an object storage platform according to an embodiment.

FIG. 2 is an exemplary block diagram illustrating a configuration of an LSM tree file system 210 for use on an object storage platform (e.g., object storage platform 108) according to an embodiment. The LSM tree file system 210 includes a catalog file 212 and a plurality of sorted data tables 214-216 as described herein. The plurality of sorted data tables 214-216 are organized in a plurality of LSM tree levels 230-236 according to known LSM tree characteristics.

The catalog file 212 includes sorted data table metadata 238-240 associated with each of the sorted data tables 214-216. Each sorted data table metadata 238-240 includes at least a table ID 242, a tree level 244, and a key range 246. The table ID 242 is a unique identifier within file system 210 for the associated sorted data table 214. It may be in the form of a code, a name, or any other practical form of identifier without departing from the description. The tree level 244 is a value that indicates the level (e.g., LSM tree levels 230, 232, 234, or 236) on which the associated sorted data table is currently located. The LSM tree levels 230-236 are described in greater detail below, but it should be understood that the tree levels 230-236 are generally configured as levels or rows of data according to known LSM tree principles as would be understood by a person of ordinary skill in the art. The key range 246 of a sorted data table indicates a range of keys (e.g., offsets or addresses of the file system, etc.) for which data is stored in the associated sorted data table. For instance, if a sorted data table includes data with keys from offset 100 to offset 150 in the file system, the key range 246 of the sorted data table may be configured to indicate the range from 100-150. Key ranges 246 may include a first key and a total number of keys or an endpoint key to express a continuous key range. Alternatively, or additionally, if a sorted data table includes multiple ranges of contiguous keys, the key range 246 may be configured to include each range (e.g., 100-150; 225-260; 300-380). In some examples, the catalog file 212 may be in the form of, for instance, a JavaScript Object Notation (JSON) file including the described metadata values.

The LSM tree file system 210 is configured to arrange sorted data tables 214-216 in one or more LSM tree levels 230-236. It should be understood that, while sorted data tables 214-216 are illustrated as part of the LSM tree level 230, all the tree levels 230-236 may include one or more sorted data tables 214-216 without departing from the description herein. Further, it should be understood that the file system 210 may include more, fewer, or different tree levels than those illustrated without departing from the description herein.

The LSM tree levels 230-236 are interrelated according to a hierarchy according to LSM tree principles. In some examples, the tree level 230 is the "top" level. All data written to the file system 210 is initially written to one or more sorted data tables 214 in the top level 230. The lower levels 232-236 are created and/or populated with sorted data tables 214-216 when data from the top level and other relatively "higher" levels undergo a "compaction" process, which is known in the art with respect to general LSM trees. Compaction may be performed when a tree level reaches a defined capacity threshold of sorted data tables and/or based on a defined time interval expiring. In some examples, compaction results in one or more sorted data tables 214-216 on the top level 230 being combined or merged into a single sorted data table and appended to the next level (e.g., LSM tree level 232) of the LSM tree file system 210.

Further, while the top level 230 may include sorted data tables with overlapping key ranges, the compaction process results in such overlapping sorted data tables being merged (e.g., using a merge sort algorithm or the like, etc.), such that none of the other levels of the LSM tree file system 210 includes sorted data tables with overlapping key ranges. Further, the sorted data tables 214-216 in levels of the file system below the top level may be arranged in key order.

Additionally, each tree level of the LSM tree file system 210 may be configured to be exponentially or otherwise substantially larger than the tree level immediately above it (e.g., as illustrated by the variable width of LSM tree levels 232, 234, and 236). Due to this substantial increase in capacity from higher level to lower level, large quantities of data may be stored and managed in the LSM tree file system 210 using relatively few total tree levels. It should be understood that this aspect of the LSM tree file system 210 is generally based on known LSM tree principles and the capacity sizes of the various tree levels 230-236 may be set to any values in accordance with known LSM tree principles without departing from the description.

Each sorted data table 214-216 includes an index 218 and a payload 220 as described herein. Each index 218 includes keys 248 mapped to offsets 250 of data blocks 252-256 in the associated payload. Thus, there is a key 248 in the index 218 associated with each data block 252-256 in the payload 220 of a sorted data table 214. In some examples, the data blocks 252-256 are sorted in key order (e.g., lowest associated key 248 to highest associated key 248). The offset 250 for each key 248 indicates the offset location of the associated data block 252-256 within the payload 220. For instance, in a system where keys 248 are block offsets or addresses within the greater file system 210, a data block 252 associated with a key 248 of 2000 (e.g., the $2000^{th}$ data block of the greater file system 210) may have an offset 250 of zero if it is the first data block in the payload 220 of the associated sorted data table 214. Thus, to access the data at offset 2000 of the file system 210, the key 248 that includes the value "2000" is found in the index 218, the mapped offset 250 of "0" is identified, and that offset 250 is used to find the location of the data block 252 in the payload 220.

In some examples, data blocks 252-256 may be configured to include associated keys 248 as well as payload data. For instance, a data block's key 248 may be located in the first data location of the data block based on the associated offset 250.

FIGS. 3A-D are exemplary block diagrams illustrating synchronization of catalog files and sorted data table indexes between an LSM tree file system and data caching client based on compaction of the LSM tree according to an embodiment. The data caching client and LSM tree file system are enabled to asynchronously operate and synchronize catalog files and indexes locklessly as described herein. In the system 300A of FIG. 3A, the server 302 includes the LSM tree file system 310 such as described above and the client 304 includes a write data cache 322 and catalog file copy 324 such as described above. It should be understood that the server 302 and client 304 may further include other components not pictured as described above with respect to FIGS. 1 and 2.

The server 302 further includes a compactor 317 component that includes hardware, firmware, and/or software configured to perform a compaction process and/or associated operations on the LSM tree file system 310. It should be understood that the compaction operations performed may be based on known LSM tree compaction principles as previously mentioned; however, differences such as the entity performing the LSM tree compaction operations may exist. For instance, sorted data tables (e.g., sorted data tables 314-316) of the top level and/or other levels (e.g., LSM tree levels 230-236) of the LSM tree may be transformed into sorted data tables on a lower level that are merged (e.g., sorted data tables with continuous key ranges of data tuples are formed from one or more sorted data tables to be compacted, etc.) and ordered (e.g., the sorted data tables are organized in an order based on the key range and no sorted data tables have overlapping key ranges, etc.), and duplicate data of the transformed sorted data tables may be eliminated (e.g., data tuples with more than one entry in the sorted data tables to be compacted are reduced to a single tuple that includes the most recent data values associated with the data tuples, etc.).

The compactor 317 is configured to perform a compaction operation on levels of the LSM tree file system 310 that are "out of shape" (e.g., levels that exceed associated level capacities, etc.).

The compactor 317 is configured to generate a compacted catalog file 313 from the catalog file 312 based on a performed compaction. Because the catalog file 312 includes the metadata that describes the structure of the LSM tree, after compaction, that metadata is updated, converting the catalog file 312 to the compacted catalog file 313. Updates may include adding new sorted data table metadata (e.g., new identifiers associated with levels and key range, etc.), adjusting levels of current sorted data tables (e.g., changing a level indicator associated with a sorted data table identifier to represent the movement of the associated table to the new level, etc.), and/or removing tables from the metadata (e.g. a sorted data table may be absorbed into another new sorted data table upon compaction such that it may be removed from the catalog file, etc.).

In some examples, the compactor 317 receives instructions that indicate a level or levels to compact and a target level upon which to place the compacted data. Alternatively, or additionally, the compactor 317 may be configured to receive a compaction indicator and, as a result of the indicator, determine levels to compact and target levels upon which to place the compacted data based on known LSM tree principles. Further, the compactor 317 may be configured to immediately perform compaction upon receiving instruction or indication to do so or, alternatively, queue a compaction event based on the received instruction or indication. Queued compaction events may be performed by the compactor 317 based on one or more compaction event requirements being met. For instance, if no compacted metadata catalog file 313 exists, a queued compaction event may be the first compaction and may be performed immediately. Further, a queued compaction event may be held in the queue until the compactor 317 confirms that the most recent previous compacted metadata catalog file 313 has been used by the client 304 to ensure that all compaction is done in an appropriate order. Such compaction event requirements are described in greater detail herein.

The client 304 further includes an LSM tree shape analyzer 321. The LSM tree shape analyzer 321 includes hardware, firmware, and/or software configured to analyze the structure of the LSM tree file system 310 based on the catalog file copy 324 and/or updated catalog file copy 325 to determine whether to send a compaction instruction to the compactor 317. In some examples, the LSM tree shape analyzer 321 compares the current number of sorted data tables in each level of the LSM tree to level capacity limits that are defined for each level. Upon identifying one or more levels that exceed the associated level capacity limits (e.g., levels that are "out of shape", etc.), the analyzer 321 may cause a compaction instruction to be sent to the compactor 317. The instruction may include an indicator to perform a compaction, identifiers of the one or more levels that are "out of shape", and/or any other data that may be used by the compactor 317 in the compaction.

The client 304 is further configured to generate an updated catalog file copy 325 from the catalog file copy 324 based on the cached data set 323 in the write data cache 322. Generating the updated catalog file copy 325 may include determining sorted data table metadata associated with the cached data set 323 and adding the determined metadata to the catalog file copy 324 (e.g., via converting the cached data set 323 into one or more sorted data tables and identifying the associated identifiers, key ranges, and the like, etc.), associating the newly added sorted data table metadata with the top level of the LSM tree structure. The generation of the updated catalog file copy 325 may be triggered based on the client 304 preparing to send the cached data set 323 to the LSM tree file system 310 for storage. Alternatively, or additionally, other events or operations of the client 304 may trigger the generation of the updated catalog file copy 325 without departing from the description here.

The client 304 is configured to send the cached data set 323 from the write data cache 322 in sorted data table format to the LSM tree file system 310 for storage. In some examples, the client 304 includes the updated catalog file copy 325 with the cached data set 323, whereby the server is enabled to use the updated catalog file copy 325 as a current catalog file 312 once the cached data set 323 is written to the file system 310 as sorted data tables.

The client 304 further includes index copies 326-328 which are copies of the indexes of the sorted data tables 314-316 as described above. The client 304 includes a compactor 329 that is configured to apply the compaction process and/or associated operations of the compactor 317 above to the index copies 326-328, such that compacted index copies 331 are generated. Because the compaction process applied to the index copies 326-328 precisely mirrors the compaction process performed by the compactor 317, the compacted index copies 331 are synchronized with the indexes of the sorted data tables of the LSM tree file system 310 after compaction. The compaction process may include identifying LSM tree levels for compaction based on the catalog file copy 324 by the LSM tree shape analyzer 321 as described above. The generation of the compacted index copies 331 may include creation of new index copies from one or more of the index copies 326-328, shifting of index copies from one LSM tree level to another by changing the metadata stored on the associated catalog file copy 324, and/or flagging index copies 326-328 for garbage collection when they are no longer in use. These processes are described in greater detail herein.

Figure 3A:
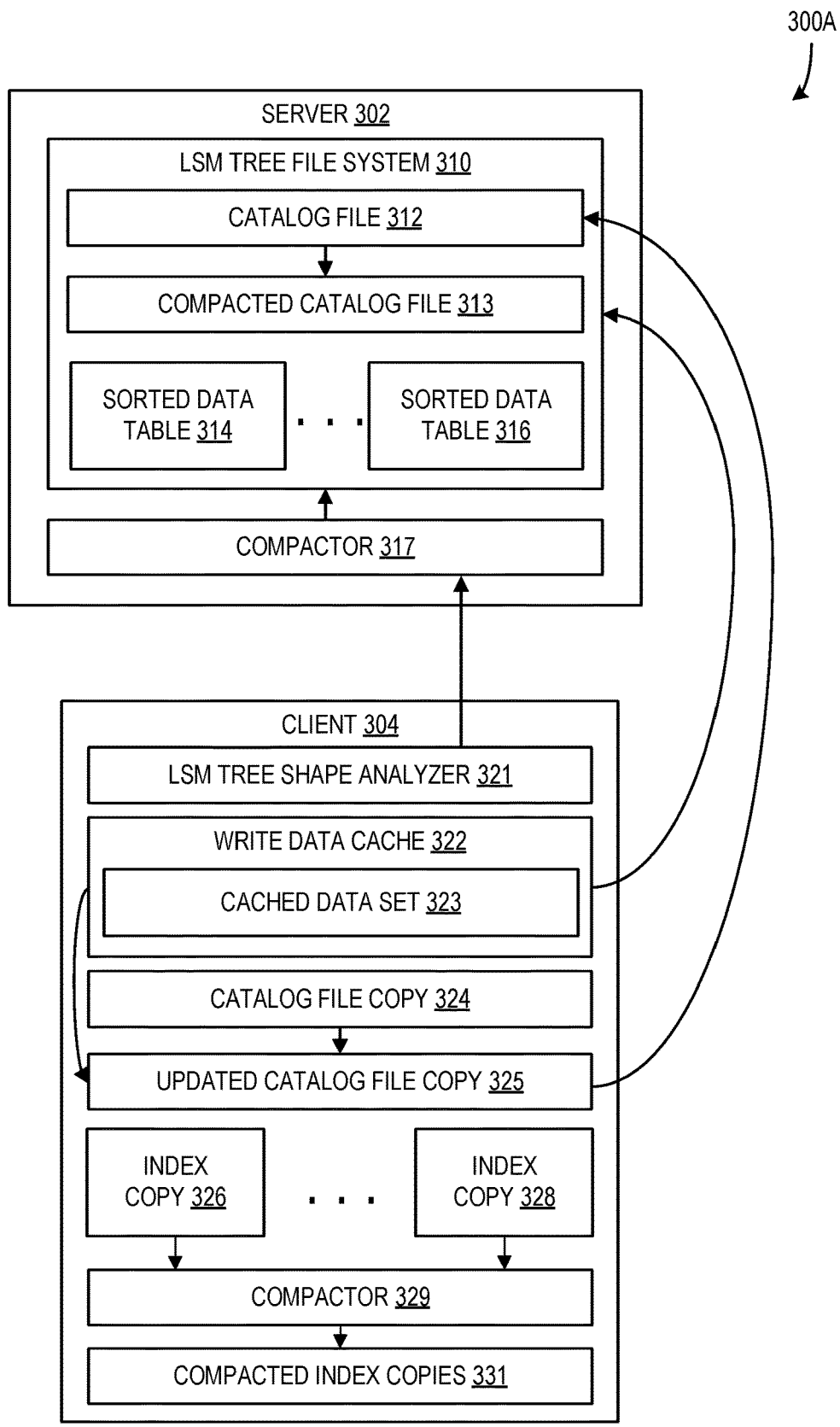
FIGS. 3A-D are exemplary block diagrams illustrating synchronization of catalog files and sorted data table indexes between an LSM tree file system and data caching client based on compaction of the LSM tree according to an embodiment.
Figure 3B:
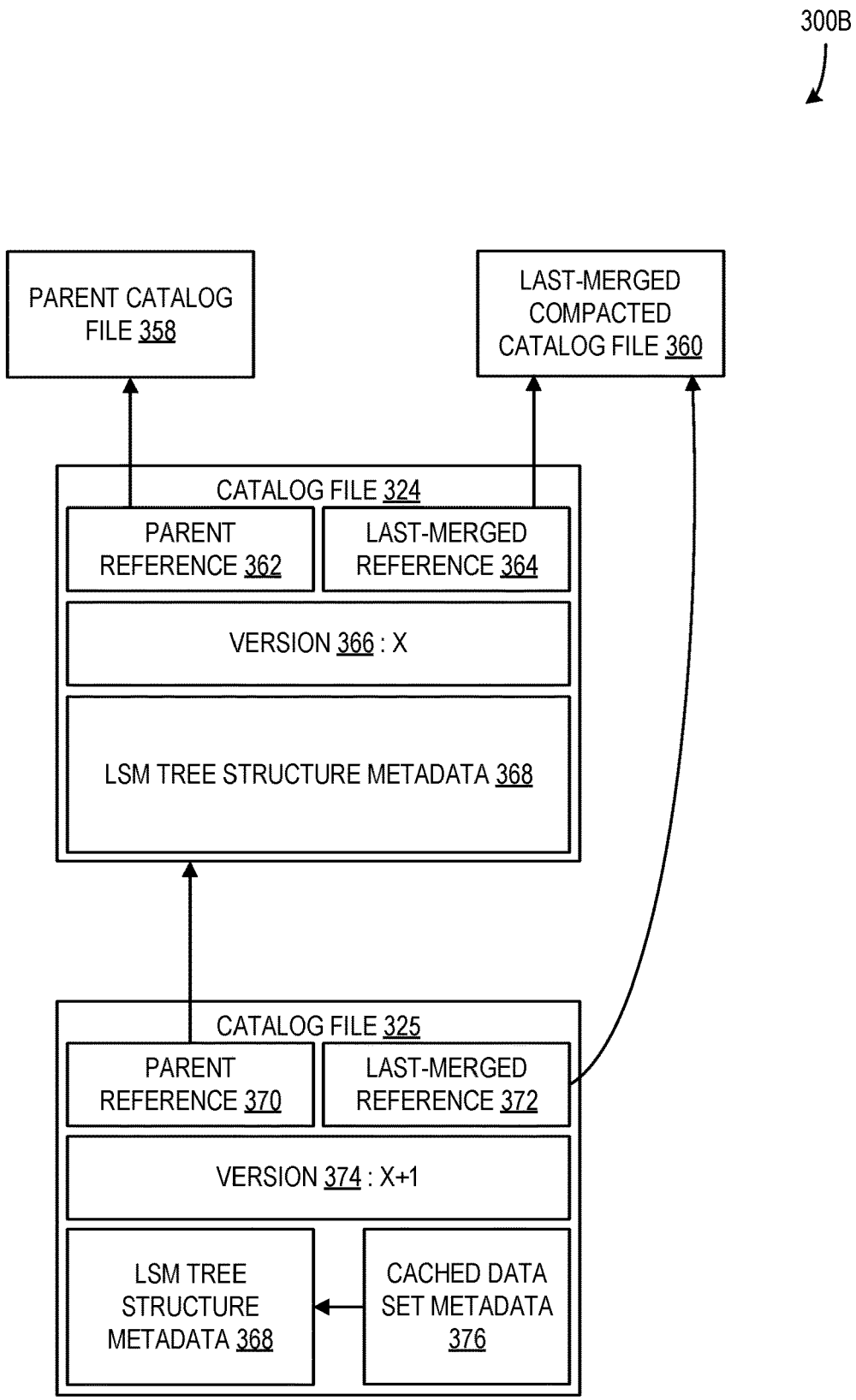

In some examples, the server 302 and/or client 304 track and maintain version information associated with the catalog files 312, 313, 324, and 325. FIG. 3B illustrates, in system 300B, an example structure and relationship between the catalog file 324 and the catalog file 325 based on associated version data and references to ancestor catalog files according to an embodiment. The catalog file 324 includes a parent reference 362 and a last-merged reference 364. The references 362 and 364 include identifiers of the associated catalog files, pointers or address references to the associated catalog files, and/or version data that may be used to identify the associated catalog files. Catalog file 324 refers to a parent catalog file 358 by parent reference 362 and a last-merged compacted catalog file 360 by last-merged reference 364. The catalog file 324 further includes a version 366 entry that indicates that catalog file 324 is version X of a catalog file associated with the LSM tree file system 310. The catalog file 324 includes the LSM tree structure metadata 368 (e.g., sorted data table metadata 238-240).

Upon generation of the updated catalog file 235 from the catalog file 324, the parent reference 370 is defined as referring to the catalog file 324 as the parent catalog file. The last-merged reference 372 is defined as referring to the same file as the last-merged reference 364 of the catalog file 324, which is the last-merged compacted catalog file 360. The last-merged reference 364 may be used in the system to determine when compaction is performed, etc. as described in greater detail below.

The catalog file 235 further includes a version 374 of X+1, which is an incremented version value from the catalog file 324 and LSM tree structure metadata 368 that is updated to include the cached data set metadata 376 (e.g., based on the cached data set 323, etc.) as described. The changes made to the metadata by including the cached data set metadata 376 represents the structural changes to be made to the LSM tree file structure upon the cached data set being written to the file structure.

Figure 3C:
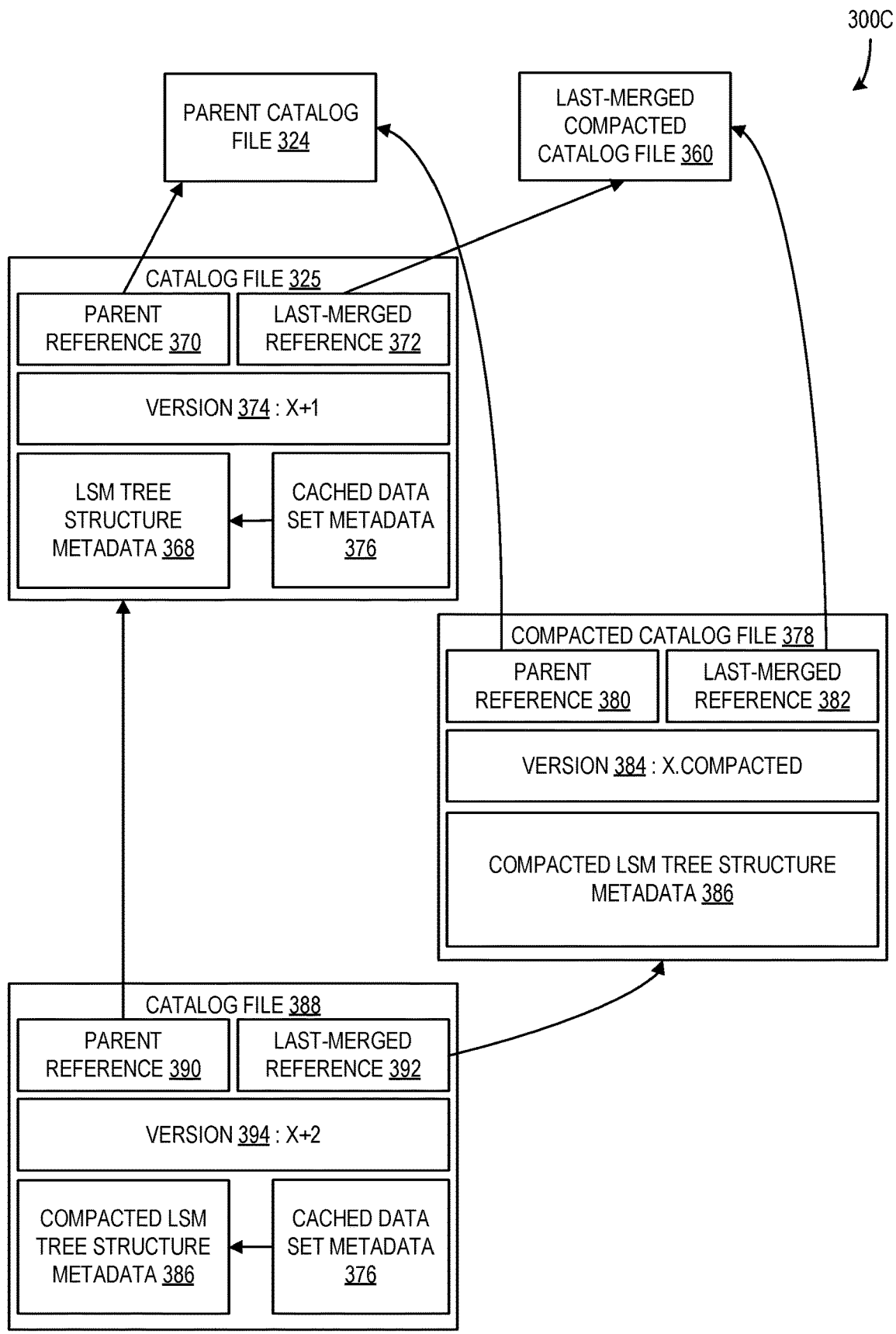

FIG. 3C illustrates, in system 300C, an example structure and relationship between the catalog file 325, a compacted catalog file 378, and a catalog file 388 based on associated version data and references to ancestor catalog files according to an embodiment. The catalog file 325 is in substantially the same state as illustrated above in FIG. 3B. Upon generation of the catalog file 325, the associated client 304 may determine that a compacted catalog file 378 exists that is more recent than the last-merged compacted catalog file 360 to which the last-merged reference 372 refers. As a result, the LSM tree structure metadata 368 of the catalog 325 is not synchronized with the LSM tree structure of the file system (e.g., LSM tree structure file system 310 on the server 302, etc.) due to compaction operations. In order to synchronize the contents, the catalog file to be sent with the cached data set catalog file 388 is generated.

As with catalog files 324 and 325 described above, the compacted catalog file 378 and catalog file 388 include parent references 308 and 390, last-merged references 382 and 392, versions 384 and 394, respectively. When a compacted catalog file 378 is generated (e.g., the generation of compacted catalog file 313 in FIG. 3A), the version 384 is assigned a value that includes the version number or indicator of the parent catalog file 324 to which the parent reference 380 refers combined with an indicator that the catalog file includes compacted LSM tree structure metadata 386 that reflects changes made to the LSM tree during compaction operations. As illustrated, the version 384 of the compacted catalog file 378 is "X.compacted". However, it should be understood that other indicators of compaction may be used without departing from the description herein. The last-merged reference 382 may refer to the previously generated compacted catalog file (e.g., last-merged compacted catalog file 360, etc.). However, in some examples, the last-merged reference 382 of a compacted catalog file 378 may remain blank or null, as the "last-merged" relationship may not be used with compacted catalog files.

The catalog file 388 may be generated to include a parent reference 390 that refers to the previously generated catalog file 325 to maintain a consistent sequence of versions and a last-merged reference 392 that refers to the compacted catalog file 378. The version 394 of the catalog file 388 is "X+2", which is incremented from the version 374 of catalog file 325. The metadata stored in the catalog file 388 is the compacted LSM tree structure metadata 386 from the compacted catalog file 378 with included cached data set metadata 376. The cached data set metadata 376 is included in the compacted LSM tree structure metadata 386 in substantially the same manner as described above with respect to including metadata 376 in the LSM tree structure metadata 368.

In some examples, multiple catalog files may have been generated in the interval between the generation of the compacted catalog file 378 and the generation of previous compacted catalog file 360 (e.g., there are intervening catalog files between the parent catalog file 324 and the catalog file 325, such that the version of the updated catalog file 325 is more than one greater than the version of the parent catalog file of the compacted catalog file 378, etc.). In that case, the merged catalog file 388 is generated to include the compacted LSM tree structure metadata 386 with included metadata from each of the previously generated catalog file versions that are more recent than the parent catalog file of the compacted catalog file 378. In order to determine the set of metadata to include in the merged catalog file 388, the metadata of the parent catalog file of the compacted catalog file 378 is compared to the metadata of the updated catalog file 325 and metadata associated with cached data sets of the intervening catalog files that have been generated since the generation of the parent catalog file are merged with the compacted LSM tree structure metadata 386 in the merged catalog file 388. Because cached data sets are only appended to the top row of the LSM tree outside of compaction, the differences may be efficiently identified by comparing the metadata of the top row of the LSM tree for newly included sorted data tables.

Figure 3D:
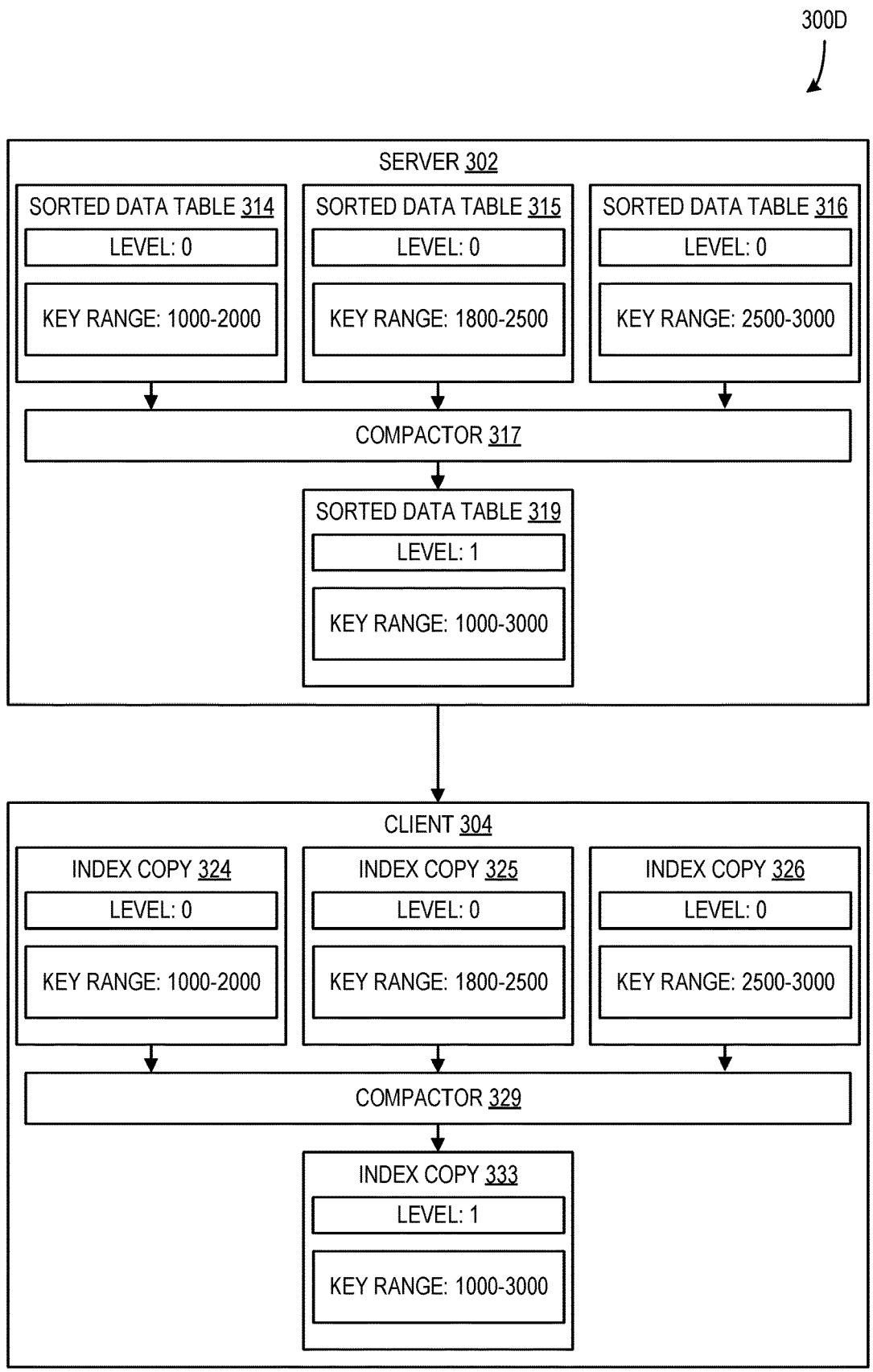

FIG. 3D illustrates, at 300D, relationship between a compaction process performed by the compactor 317 on the sorted data tablets 314-316 and a compaction process performed by the compactor 329 on the index copies 324-326 according to an embodiment. As described above, the server 302 includes the sorted data tables 314-316 and the compactor 317. In some examples, the compactor 317 performs a compaction process on the illustrated sorted data tables 314, 315, and 316 to form sorted data table 319. It should be understood that, while only the sorted data tables 314, 315, and 316 are shown, more, fewer, or different sorted data tables may be included on the server 302 without departing from the description.

Each of the sorted data tables 314, 315, and 316 is associated with a tree level of an LSM tree file system (e.g., LSM tree file system 310) and a key range (e.g., the range of keys of the key-value tuples of data stored in the sorted data table, etc.). In some examples, the tree level of each sorted data table is stored in the metadata of the metadata catalog file (e.g., catalog file 312, 313) and/or on each respective sorted data table. The key range of each sorted data table is stored and/or represented in the metadata catalog file (e.g., catalog file 312, 313) and/or the metadata of the index of each respective sorted data table (e.g. index 218). Each of the sorted data tables 314, 315, 316 are associated with level 0, or the top level (e.g., tree level 230), of the LSM tree file system. Sorted data table 314 has a key range of 1000-2000, sorted data table 315 has a key range of 1800-2500, and sorted data table 316 has a key range of 2500-3000.

The compactor 317 performs a compaction process on the sorted data tables 314, 315, and 316, resulting in the generation of a sorted data table 319 based on merging tables 314, 315, and 316 together. The newly generated sorted data table 319 is associated with level 1 of the LSM tree file system because the compaction process is configured to transfer data from higher tree levels to lower tree levels. Further, the sorted data table 319 includes the key range of 1000-3000 based on the compaction process merging the key-value tuples of each of the sorted data tables 314, 315, and 316 based on LSM tree compaction principles. For instance, the compactor 317 may identify that the key ranges of the tables 314, 315, and 316 are contiguous and determine to merge the tables together. The data of the tables 314, 315, and 316 may be merged into the sorted data table 319 in key order. Further, the compactor 317 may identify that the sorted data tables 314 and 315 have overlapping key ranges (e.g., keys 1800-2000). Based on LSM tree compaction principles, the compactor 317 may merge the most recent key-value tuples associated with the key range 1800-2000 into the sorted data table 319. Older key-value tuples of that key range may not be included in the sorted data table 319 and/or flagged for garbage collection.

After the described compaction is performed by the compactor 317, the server 302 may indicate to the client 304 that the compaction has been performed. The indication may be in response to a request by the client 304, as described herein. For instance, when the client 304 has received instructions to write the data in the associated data cache to the LSM tree file system, the client 304 may request information about the most recent compaction process and/ or any associated compacted catalog file (e.g., compacted catalog file 378) as described herein. Upon receiving indication that a compaction process has been performed at the server 302 that the client 304 has not accounted for, the compactor 329 may be configured to perform the same compaction process on the index copies 324, 325, and 326 that was performed by the compactor 317 on the sorted data tables 314, 315, and 316 (e.g., the compaction process performed by the compactor 329 affects only the index metadata of the index copies, as the associated payload data does not reside on the client). Because compaction is performed based on the key metadata of key-value tuples, the same compaction process may be performed by the compactor 329 based on the metadata of the index copies 324, 325, and 326 and/or metadata stored in catalog file copies (e.g., catalog file copies 324, 325) on the client 304. It should be understood that the index copies 324, 325, and 326 are copies of the index portions of the sorted data tables 314, 315, and 316 respectively. Further, after the compaction process is performed by the compactor 329, because the compaction process is the same as the process performed by the compactor 317, the index copy 333 is a copy of the index portion of the newly generated sorted data table 319. It should be understood that, in some examples, the index copy 333 is generated during the compaction process of compactor 329 without downloading data of the sorted data table 319 from the server 302. As illustrated, the index copies 324, 325, and 326 are associated with the same tree levels and key ranges of the respective data tables, 314, 315, and 316. Further, the index copy 333 is associated with the with the same tree level and key range as the sorted data table 319. While the index copy 333 does not include a payload data portion of the sorted data table 319, the metadata of the index copy 333 (e.g., the key-offset relationships describing the content of the associated sorted data table, etc.) matches the index portion of the sorted data table 319, such that the index copy 333 is synchronized with the sorted data table 319.

Figure 4:
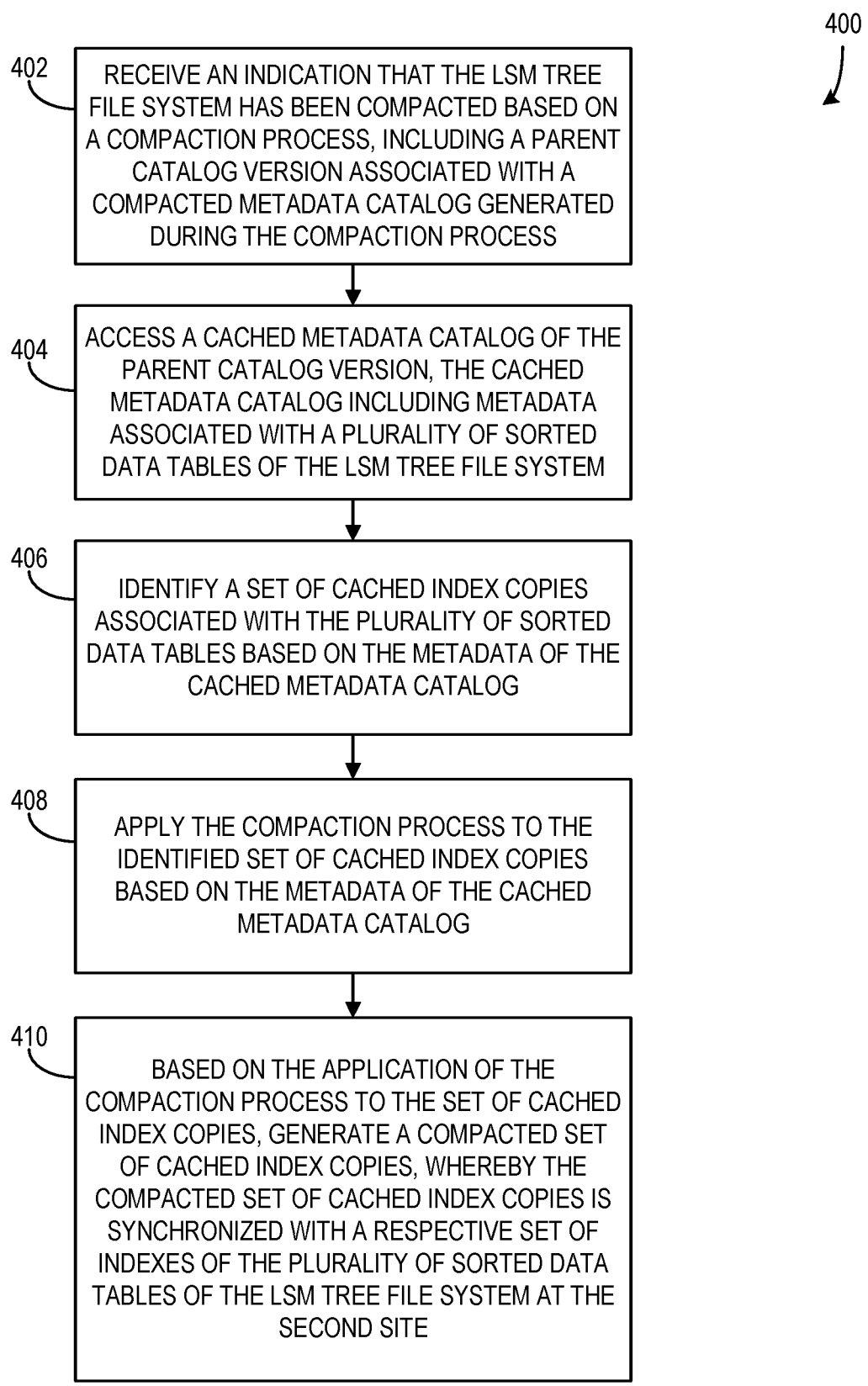
FIG. 4 is an exemplary flow chart illustrating a method of synchronizing cached index copies at a first site with associated sorted data tables of an LSM tree file system at a second site according to an embodiment.

FIG. 4 is an exemplary flow chart illustrating a method 400 of synchronizing cached index copies at a first site (e.g., index copies 324, 325, 326, 333) with associated sorted data tables of an LSM tree file system at a second site (e.g., sorted data tables 314, 315, 316, 319) according to an embodiment. It should be understood that the method 400 may be implemented and/or performed by a system configured as described above in FIGS. 1, 2, and 3A-D. At 402, a client (e.g., client 304) at a first site receives an indication that the LSM tree file system has been compacted based on a compaction process. In some examples, the indication includes a parent catalog version associated with a compacted metadata catalog generated during the compaction process. For instance, the indication may include a version of the parent catalog file 324 associated with the compacted catalog file 378 of FIG. 3C. Alternatively, or additionally, the indication of the compaction may include information about the compaction that may be necessary to recreate the compaction process at the client. For instance, in some examples, the indication may include the compacted catalog file itself, which may later be of use during the compaction process of the index copies described below. Further, the indication of the compaction may include information about which levels of sorted data tables have been compacted.

At 404, a cached metadata catalog of the parent catalog version is accessed. The cached metadata catalog includes metadata associated with a plurality of sorted data tables of the LSM tree file system. For instance, the client may access the parent catalog file 324 based on the included parent catalog version information from the compacted catalog file 378 in the received indication. In some examples, the client may store and/or maintain one or more cached metadata catalog versions for use in compacting the index copies as described, such that retrieving an associated metadata catalog from the LSM tree file system or another associated source is not necessary. Because the accessed metadata catalog is the parent catalog of the compacted metadata catalog, it describes the structure of the LSM tree file system prior to the performance of the compaction process. Therefore, the accessed metadata catalog is used as a structural starting point for the compaction of the index copies on the client.

At 406, the client identifies a set of cached index copies associated with the plurality of sorted data tables based on the metadata of the cached metadata catalog. In some examples, the identified set of cached index copies includes all of the currently cached index copies. At 408, the compaction process applied to the LSM tree file system is applied to the identified set of cached index copies based on the metadata of the cached metadata catalog. The cached metadata catalog includes tree level metadata associated with each sorted data table (e.g., the tree level 244 of sorted data table metadata 238 in the catalog file 212, etc.) and, therefore, tree level metadata associated with each index copy of the identified set of index copies. The tree level metadata may be used by the client to identify tree levels that were compacted in the compaction process of the LSM tree file system (e.g., a shape analysis as described above with respect to the LSM tree shape analyzer 321, etc.). Applying the compaction process further includes identifying the index copies associated with the tree levels to be compacted and merging the index copies based on associated key ranges, sorting the index copies based on associated key range, and/or shifting index copies from the tree levels being compacted to a lower tree level based on known LSM tree compaction principles.

Based on the application of the compaction process to the set of cached index copies, at 410, a compacted set of cached index copies is generated. As a result of the compaction process, the compacted set of cached index copies is synchronized with a respective set of indexes of the plurality of sorted data tables of the LSM tree file system at the second site (e.g., the server, etc.). In some examples, during or after generation of the compacted set of cached index copies, index copies that have been merged into other index copies in the compacted set or are otherwise rendered unused may be flagged for garbage collection by the client. Garbage collection of unused index copies is described in greater detail below.

Figure 5:
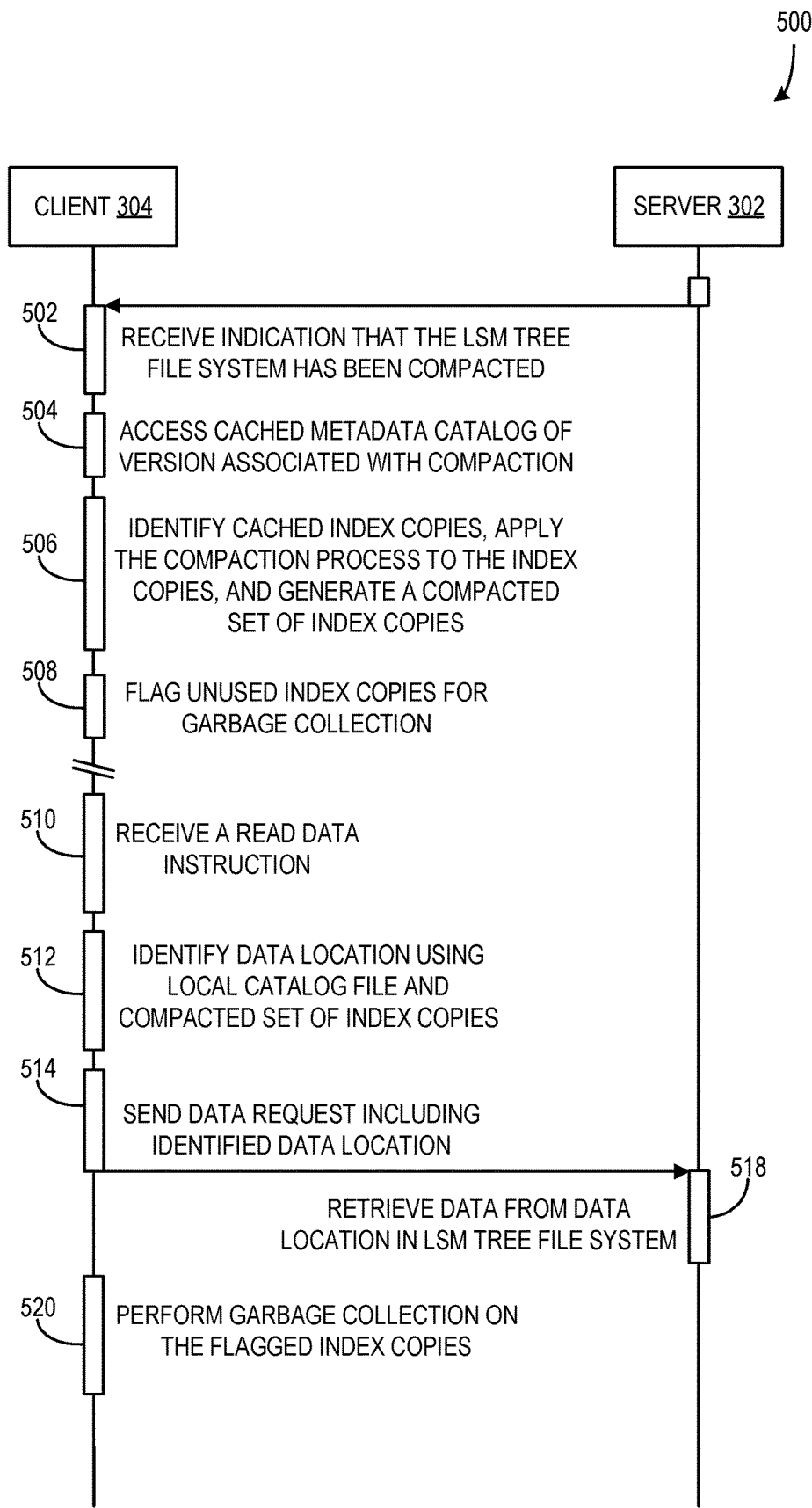
FIG. 5 is an exemplary sequence diagram illustrating operations of a client and server of during synchronization of index copies at the client with indexes of an associated LSM tree file system at the server according to an embodiment.

FIG. 5 is an exemplary sequence diagram illustrating operations of a client and server of during synchronization of index copies at the client with indexes of an associated LSM tree file system at the server according to an embodiment. The diagram 500 includes operations substantially similar to the method 400 described above and may be performed by a system configured as described above with respect to FIGS. 1, 2, and 3A-D. It should be understood that the operations of the client 104 may be performed by a first processor or processors of the client 104 and the operations of the server 102 may be performed by second processor or processors of the server 102. At 502, the client 304 receives an indication that the LSM tree file system has been compacted from the server 302 as described herein. The client 304 accesses a cached metadata catalog of a version associated with the compacted metadata catalog from the compaction at 504. At 506, the client 304 identifies associated cached index copies, applies the compaction process to the index copies, and thereby generates a compacted set of index copies as described above. At 508, the unused index copies are flagged for garbage collection as a result of the application of the compaction process.

At a later time, at 510, the client 304 receives a read data instruction indicating that the client 304 should retrieve data from the LSM tree file system of the server 302. At 512, the client 304 identifies a data location or locations of the data to be retrieved using a local catalog file and the compacted set of index copies. The data location may be identified based on analysis of key ranges of the metadata of a cached catalog file to identify one or more index copies associated with the data to be retrieved. The index copies may be accessed to determine a specific data location or locations within the index copies based on the key-offset mapping of the index copies. Because the cached index copies are synchronized with the LSM tree file system based on the processes described herein, the identified data location or locations may be used to request data from the server 302, at 514, and the server 302 may make use of the data location or locations to efficiently access and/or retrieve the requested data from the LSM tree file system.

Further, at 520, the client 304 performs garbage collection of the flagged index copies, such that memory space occupied by the flagged index copies is reclaimed and/or freed as would be understood by a person of ordinary skill in the art. It should be understood that, while the performance of the garbage collection is shown as occurring after the other operations of the diagram 500, in some examples, the garbage collection process may be performed by the client 304 as a background process based on a defined interval and/or based on occurrence of defined events.

It should be understood that, through use of parallel compaction processes on the server and client as described herein, the metadata indexes of the LSM tree file system and the cached index copies at the client are kept in sync without requiring the client to upload updated index copies to the LSM tree file system server and without requiring the client to download updated index copies from the LSM tree file system server. Both uploading and downloading large quantities of indexes requires substantial bandwidth resources, the costs of which are avoided through the described process.

Additional Example Scenarios

Aspects of the disclosure enable various additional scenarios, such as next described.

In an example, an LSM tree file system is installed on an object storage platform as described herein. The object storage platform is installed on a server which is connected via a network to a client. The client performs I/O operations, including caching data and sending data to the LSM tree file system as described herein. The client receives data from an application and writes it to the data cache to stage it for later transmission to the LSM tree file system. Adding the data to the data cache triggers an instruction to send the currently cached data to the file system based on either a timeout or the total cached data exceeding a cache capacity threshold.

To facilitate sending currently cached data to the file system, the client requests data about the most recent compaction performed on the LSM tree file system. The server responds by providing a version (e.g., "5.compacted", etc.) of the compacted metadata catalog associated with the most recent compaction. The version includes the version (e.g., "5", etc.) of the parent metadata catalog of the compacted metadata catalog.

The client accesses a cached metadata catalog of the received parent version and identifies an associated set of cached index copies. Using the metadata of the cached metadata catalog, the client applies the compaction process that was performed on the LSM tree file system to the identified set of cached index copies. A compacted set of index copies is generated based on the application of the compaction process. The compacted set of index copies are synchronized with the indexes of the LSM tree file system.

In a further example, after the compacted set of index copies is generated, the identified set of index copies used as a starting point for the compaction process are flagged for garbage collection and, later, a background garbage collection process reclaims the memory space occupied by the flagged index copies.

In another example, the client receives instructions to read data from the LSM tree file structure. The client accesses the cached metadata catalog file and the compacted set of index copies to determine a data location of the data to be read in the LSM tree file structure. The client requests the data to be read and includes the determined data location in the request. The server retrieves the data from the LSM tree file structure based on the included data location and responds to the request with the retrieved data.

Exemplary Operating Environment

Figure 6:
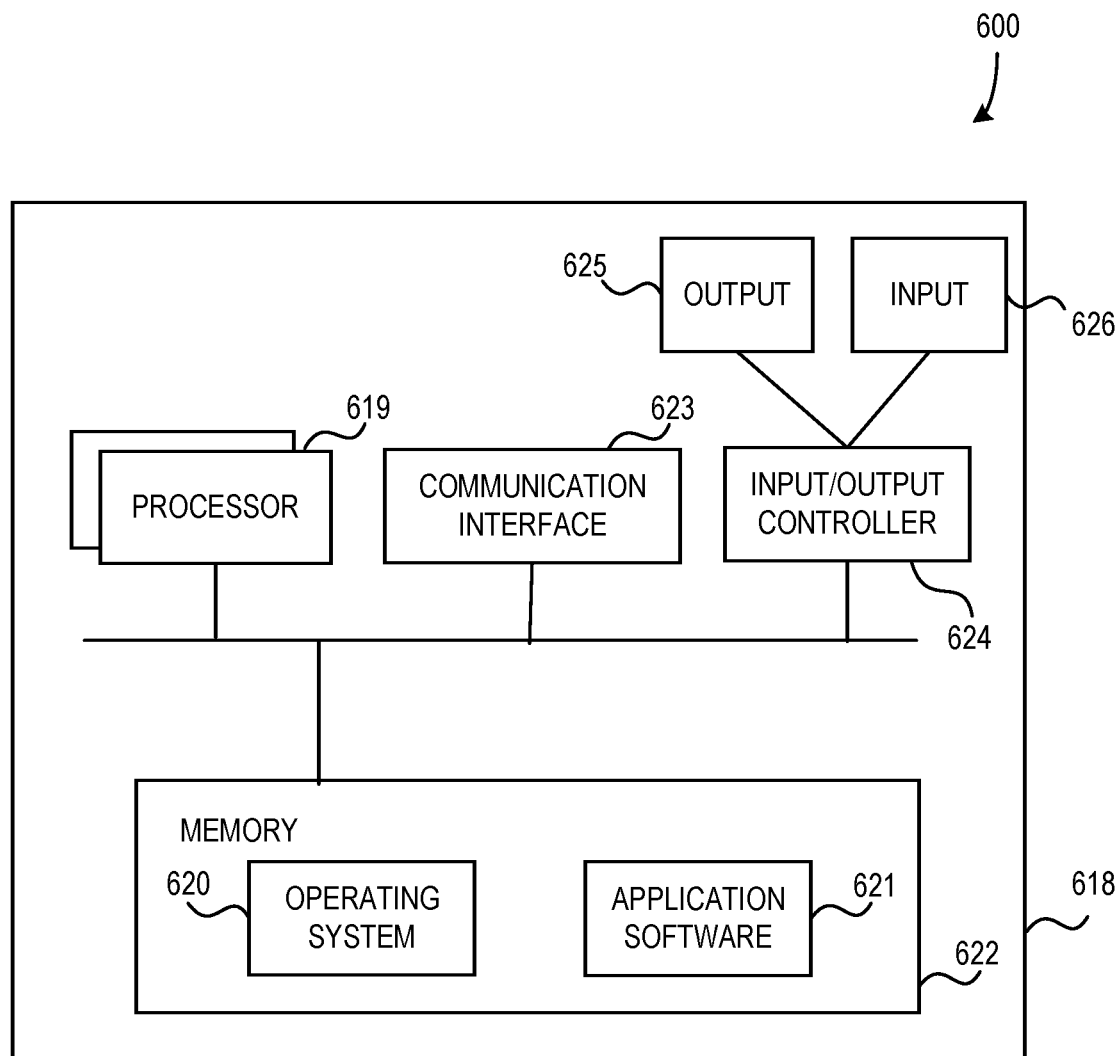
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, synchronizing the cached index copies at a first site with indexes of sorted data tables of an LSM tree file system at a second site as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

A computerized method for synchronizing cached index copies at a first site with indexes of a log-structured merge (LSM) tree file system on an object storage platform at a second site comprises: receiving, by a processor at the first site, an indication that the LSM tree file system has been compacted based on a compaction process, the indication including a parent catalog version associated with a compacted metadata catalog generated at the second site during the compaction process; accessing, by the processor, a cached metadata catalog of the included parent catalog version at the first site, the cached metadata catalog including metadata associated with a plurality of sorted data tables of the LSM tree file system; identifying, by the processor, a set of cached index copies at the first site associated with the plurality of sorted data table based on the metadata of the cached metadata catalog; applying, by the processor, the compaction process to the identified set of cached index copies based on the metadata of the cached metadata catalog; and based on the application of the compaction process to the set of cached index copies, generating, by the processor, a compacted set of cached index copies at the first site, whereby the compacted set of cached index copies is synchronized with a respective set of indexes of the plurality of sorted data tables of the LSM tree file system at the second site.

An example computer system comprises: a processor at a first site; a non-transitory computer readable medium having stored thereon program code for synchronizing cached index copies at the first site with indexes of a log-structured merge (LSM) tree file system on an object storage platform at a second site, the program code causing the processor to: receive an indication that the LSM tree file system has been compacted based on a compaction process, the indication including a parent catalog version associated with a compacted metadata catalog generated at the second site during the compaction process; access a cached metadata catalog of the included parent catalog version at the first site, the cached metadata catalog including metadata associated with a plurality of sorted data tables of the LSM tree file system; identify a set of cached index copies at the first site associated with the plurality of sorted data table based on the metadata of the cached metadata catalog; apply the compaction process to the identified set of cached index copies based on the metadata of the cached metadata catalog; and based on the application of the compaction process to the set of cached index copies, generate a compacted set of cached index copies at the first site, whereby the compacted set of cached index copies is synchronized with a respective set of indexes of the plurality of sorted data tables of the LSM tree file system at the second site.

An exemplary non-transitory computer readable storage medium having stored thereon program code executable by a first computer system at a first site, the program code embodying a method comprises: receiving, at the first site, an indication that an LSM tree file system at a second site has been compacted based on a compaction process, the indication including a parent catalog version associated with a compacted metadata catalog generated at the second site during the compaction process; accessing a cached metadata catalog of the included parent catalog version at the first site, the cached metadata catalog including metadata associated with a plurality of sorted data tables of the LSM tree file system; identifying a set of cached index copies at the first site associated with the plurality of sorted data table based on the metadata of the cached metadata catalog; applying the compaction process to the identified set of cached index copies based on the metadata of the cached metadata catalog; and based on the application of the compaction process to the set of cached index copies, generating a compacted set of cached index copies at the first site, whereby the compacted set of cached index copies is synchronized with a respective set of indexes of the plurality of sorted data tables of the LSM tree file system at the second site.

Alternatively, or in addition to the other examples described herein, examples include any combination of the following:

wherein generating the compacted set of cached index copies includes generating at least one compacted index copy that includes index metadata over a key range based on at least one cached index copy of the identified set of cached index copies that includes metadata over at least a portion of the key range; flagging the at least one cached index copy of the identified set of cached index copies for garbage collection; and performing a garbage collection process on the flagged at least one cached index copy, whereby memory associated with the flagged at least one cached index copy is reclaimed.

wherein generating the compacted set of cached index copies includes merging key-value tuples of a plurality of cached index copies of the identified set of cached index copies into a single compacted index copy of the compacted set of cached index copies in a sorted order.

further comprising, based on receiving a read data instruction associated with a requested data set, identifying a data location associated with the requested data set based on the compacted set of cached index copies and sending a request to the LSM tree file system at the second site including the identified data location.

wherein applying the compaction process to the identified set of cached index copies includes identifying at least one tree level of the LSM tree file system that exceeds an associated tree level capacity based on the metadata of the cached metadata catalog and flagging the at least one tree level for compaction.

wherein applying the compaction process to the identified set of cached index copies further includes performing the compaction process over a key range of cached index copies of the identified set of cached index copies associated with the identified at least one tree level.

wherein receiving an indication that the LSM tree file system has been compacted based on a compaction process includes receiving the indication from the second site over a network connection.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving, at the first site, an indication that the LSM tree file system has been compacted based on a compaction process, the indication including a parent catalog version associated with a compacted metadata catalog generated at the second site during the compaction process; exemplary means for accessing a cached metadata catalog of the included parent catalog version at the first site, the cached metadata catalog including metadata associated with a plurality of sorted data tables of the LSM tree file system; exemplary means for identifying a set of cached index copies at the first site associated with the plurality of sorted data table based on the metadata of the cached metadata catalog; exemplary means for applying the compaction process to the identified set of cached index copies based on the metadata of the cached metadata catalog; and based on the application of the compaction process to the set of cached index copies, exemplary means for generating a compacted set of cached index copies at the first site, whereby the compacted set of cached index copies is synchronized with a respective set of indexes of the plurality of sorted data tables of the LSM tree file system at the second site.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for synchronizing cached index copies at a first site with indexes of a log-structured merge (LSM) tree file system on an object storage platform at a second site, the method comprising:
    receiving, by a processor at the first site, an indication that the LSM tree file system has been compacted based on a compaction process, the indication including a parent catalog version associated with a compacted metadata catalog generated at the second site during the compaction process;
    accessing, by the processor, a cached metadata catalog of the included parent catalog version at the first site, the cached metadata catalog including metadata associated with a plurality of sorted data tables of the LSM tree file system;
    identifying, by the processor, a set of cached index copies at the first site associated with the plurality of sorted data table based on the metadata of the cached metadata catalog;
    applying, by the processor, the compaction process to the identified set of cached index copies based on the metadata of the cached metadata catalog; and
    based on the application of the compaction process to the set of cached index copies, generating, by the processor, a compacted set of cached index copies at the first site, whereby the compacted set of cached index copies is synchronized with a respective set of indexes of the plurality of sorted data tables of the LSM tree file system at the second site, wherein the first site includes a client, the second site includes a server, and the client and server are in communication via a network.

2. The computerized method of claim 1, wherein generating the compacted set of cached index copies includes generating, by the processor, at least one compacted index copy that includes index metadata over a key range based on at least one cached index copy of the identified set of cached index copies that includes metadata over at least a portion of the key range;
    flagging, by the processor, the at least one cached index copy of the identified set of cached index copies for garbage collection; and
    performing, by the processor, a garbage collection process on the flagged at least one cached index copy, whereby memory associated with the flagged at least one cached index copy is reclaimed.

3. The computerized method of claim 1, wherein generating the compacted set of cached index copies includes merging key-value tuples of a plurality of cached index copies of the identified set of cached index copies into a single compacted index copy of the compacted set of cached index copies in a sorted order.

4. The computerized method of claim 1, further comprising:
    based on receiving a read data instruction associated with a requested data set, identifying, by the processor, a data location associated with the requested data set based on the compacted set of cached index copies and sending a request to the LSM tree file system at the second site including the identified data location.

5. The computerized method of claim 1, wherein applying the compaction process to the identified set of cached index copies includes identifying at least one tree level of the LSM tree file system that exceeds an associated tree level capacity based on the metadata of the cached metadata catalog and flagging the at least one tree level for compaction.

6. The computerized method of claim 5, wherein applying the compaction process to the identified set of cached index copies further includes performing the compaction process over a key range of cached index copies of the identified set of cached index copies associated with the identified at least one tree level.

7. The computerized method of claim 1, wherein receiving an indication that the LSM tree file system has been compacted based on a compaction process includes receiving the indication from the second site over a network connection.

8. A computer system comprising:
    a processor at a first site;
    a non-transitory computer readable medium having stored thereon program code for synchronizing cached index copies at the first site with indexes of a log-structured merge (LSM) tree file system on an object storage platform at a second site, the program code causing the processor to:
    receive an indication that the LSM tree file system has been compacted based on a compaction process, the indication including a parent catalog version associated with a compacted metadata catalog generated at the second site during the compaction process;
    access a cached metadata catalog of the included parent catalog version at the first site, the cached metadata catalog including metadata associated with a plurality of sorted data tables of the LSM tree file system;
    identify a set of cached index copies at the first site associated with the plurality of sorted data table based on the metadata of the cached metadata catalog;
    apply the compaction process to the identified set of cached index copies based on the metadata of the cached metadata catalog; and
    based on the application of the compaction process to the set of cached index copies, generate a compacted set of cached index copies at the first site, whereby the compacted set of cached index copies is synchronized with a respective set of indexes of the plurality of sorted data tables of the LSM tree file system at the second site, wherein the first site includes a client, the second site includes a server, and the client and server are in communication via a network.

9. The system of claim 8, wherein generating the compacted set of cached index copies includes generating, by the processor, at least one compacted index copy that includes index metadata over a key range based on at least one cached index copy of the identified set of cached index copies that includes metadata over at least a portion of the key range;
flagging, by the processor, the at least one cached index copy of the identified set of cached index copies for garbage collection; and
performing, by the processor, a garbage collection process on the flagged at least one cached index copy, whereby memory associated with the flagged at least one cached index copy is reclaimed.

10. The system of claim 8, wherein generating the compacted set of cached index copies includes merging key-value tuples of a plurality of cached index copies of the identified set of cached index copies into a single compacted index copy of the compacted set of cached index copies in a sorted order.

11. The system of claim 8, the program code further causing the processor to:
based on receiving a read data instruction associated with a requested data set, identify a data location associated with the requested data set based on the compacted set of cached index copies and sending a request to the LSM tree file system at the second site including the identified data location.

12. The system of claim 8, wherein applying the compaction process to the identified set of cached index copies includes identifying at least one tree level of the LSM tree file system that exceeds an associated tree level capacity based on the metadata of the cached metadata catalog and flagging the at least one tree level for compaction.

13. The system of claim 12, wherein applying the compaction process to the identified set of cached index copies further includes performing the compaction process over a key range of cached index copies of the identified set of cached index copies associated with the identified at least one tree level.

14. The system of claim 8, wherein receiving an indication that the LSM tree file system has been compacted based on a compaction process includes receiving the indication from the second site over the network.

15. A non-transitory computer readable storage medium having stored thereon program code executable by a first computer system at a first site, the program code embodying a method comprising:
receiving, at the first site, an indication that the LSM tree file system has been compacted based on a compaction process, the indication including a parent catalog version associated with a compacted metadata catalog generated at the second site during the compaction process;
accessing a cached metadata catalog of the included parent catalog version at the first site, the cached metadata catalog including metadata associated with a plurality of sorted data tables of the LSM tree file system;
identifying a set of cached index copies at the first site associated with the plurality of sorted data table based on the metadata of the cached metadata catalog;
applying the compaction process to the identified set of cached index copies based on the metadata of the cached metadata catalog; and
based on the application of the compaction process to the set of cached index copies, generating a compacted set of cached index copies at the first site, whereby the compacted set of cached index copies is synchronized with a respective set of indexes of the plurality of sorted data tables of the LSM tree file system at the second site, wherein the first site includes a client, the second site includes a server, and the client and server are in communication via a network.

16. The non-transitory computer readable storage medium of claim 15, wherein generating the compacted set of cached index copies includes generating at least one compacted index copy that includes index metadata over a key range based on at least one cached index copy of the identified set of cached index copies that includes metadata over at least a portion of the key range;
flagging the at least one cached index copy of the identified set of cached index copies for garbage collection; and
performing a garbage collection process on the flagged at least one cached index copy, whereby memory associated with the flagged at least one cached index copy is reclaimed.

17. The non-transitory computer readable storage medium of claim 15, wherein generating the compacted set of cached index copies includes merging key-value tuples of a plurality of cached index copies of the identified set of cached index copies into a single compacted index copy of the compacted set of cached index copies in a sorted order.

18. The non-transitory computer readable storage medium of claim 15, the program code embodying a method further comprising:
based on receiving a read data instruction associated with a requested data set, identifying a data location associated with the requested data set based on the compacted set of cached index copies and sending a request to the LSM tree file system at the second site including the identified data location.

19. The non-transitory computer readable storage medium of claim 15, wherein applying the compaction process to the identified set of cached index copies includes identifying at least one tree level of the LSM tree file system that exceeds an associated tree level capacity based on the metadata of the cached metadata catalog and flagging the at least one tree level for compaction.

20. The non-transitory computer readable storage medium of claim 19, wherein applying the compaction process to the identified set of cached index copies further includes performing the compaction process over a key range of cached index copies of the identified set of cached index copies associated with the identified at least one tree level.

* * * * *